US010780656B2

(12) United States Patent
Delfino et al.

(10) Patent No.: US 10,780,656 B2
(45) Date of Patent: Sep. 22, 2020

(54) DEVICE FOR IMPREGNATION AND CURING OF CONTINUOUS FIBERS WITH RESIN

(71) Applicants: Compagnie Generale des Etablissements Michelin, Clermont-Ferrand (FR); Michelin Recherche et Technique S.A., Granges-Paccot (CH)

(72) Inventors: Antonio Delfino, Givisiez (CH); Oliver Joye, Givisiez (CH); Pascal Schroeter, Givisiez (CH); Sylvain Grandjean, Givisiez (CH)

(73) Assignee: COMPAGNIE GENERALE DES ETABLISSMENTS MICHELIN, Clermont-Ferrand (FR)

(*) Notice: Subject to any disclaimer, the term of this patent is extended or adjusted under 35 U.S.C. 154(b) by 0 days.

(21) Appl. No.: 15/769,448

(22) PCT Filed: Oct. 30, 2015

(86) PCT No.: PCT/IB2015/058419
§ 371 (c)(1),
(2) Date: Apr. 19, 2018

(87) PCT Pub. No.: WO2017/072561
PCT Pub. Date: May 4, 2017

(65) Prior Publication Data
US 2018/0304561 A1 Oct. 25, 2018

(51) Int. Cl.
B29C 70/52 (2006.01)
B29C 35/10 (2006.01)
B29B 15/12 (2006.01)
B29B 15/14 (2006.01)
B29C 35/08 (2006.01)

(52) U.S. Cl.
CPC .......... *B29C 70/522* (2013.01); *B29B 15/122* (2013.01); *B29B 15/125* (2013.01);
(Continued)

(58) Field of Classification Search
CPC .......... B29C 70/04; B29C 70/06; B29B 15/14
See application file for complete search history.

(56) References Cited

U.S. PATENT DOCUMENTS 2,772,518 A 12/1956 Whitehurst
5,176,775 A * 1/1993 Montsinger ........... B29B 15/122
118/123

(Continued)

FOREIGN PATENT DOCUMENTS

EP 1174250 * 1/2002 ........... B29B 15/125
EP 2792422 10/2014
WO WO 2010/077132 7/2010

OTHER PUBLICATIONS

Hinc, Henri, English translation of EP1174250, Jan. 23, 2002 (Year: 2002).*
(Continued)

Primary Examiner — Abbas Rashid
Assistant Examiner — Eric T Chen
(74) Attorney, Agent, or Firm — Dority & Manning, P.A.

(57) ABSTRACT

An apparatus for preparation of a continuous composite element formed of reinforcement fibers impregnated with a resin that includes photo-initiators for curing. Reinforcement fibers are pulled through a vacuum chamber (110) and then a vertical impregnation chamber (122) where impregnation with the resin occurs. The elongate composite is then deposited onto a rotating wheel of conformation (140). During rotation, a radiation source (146) such as e.g., LEDs (light emitting diodes) are used to activate the photo-initiators and provide at least partial curing of the resin.
(Continued)

From the wheel of conformation, the continuous composite element is passed along a vertical course (148) where additional radiation sources (150) activate the photo-initiators and provided additional curing.

16 Claims, 3 Drawing Sheets

(52) U.S. Cl.
CPC .............. *B29B 15/14* (2013.01); *B29C 35/10* (2013.01); *B29C 70/526* (2013.01); *B29C 2035/085* (2013.01); *B29C 2035/0833* (2013.01); *B29C 2035/0877* (2013.01)

(56) References Cited

U.S. PATENT DOCUMENTS

| | | | |
|---|---|---|---|
| 5,456,781 A * | 10/1995 | Tingley | ................. B29C 70/525 156/154 |
| 5,869,178 A | 2/1999 | Kusy | |
| 6,679,695 B2 | 1/2004 | Kusy | |
| 7,484,949 B2 | 2/2009 | Hinc | |
| 8,357,878 B2 | 1/2013 | Leonhardt et al. | |
| 8,585,947 B2 | 11/2013 | Meraldi | |
| 8,604,448 B2 | 12/2013 | Hartsuiker et al. | |
| 2007/0187612 A1 * | 8/2007 | Inoue | ................. B29C 65/1406 250/372 |
| 2010/0181006 A1 | 7/2010 | Delfino | |
| 2012/0196122 A1 | 8/2012 | Bishop | |
| 2013/0228707 A1 | 9/2013 | Nieminen | |

OTHER PUBLICATIONS

International Search Report and Written Opinion for PCT/IB2015/058419 dated Jul. 25, 2016.
S.T. Peters Handbook of Composites 1998. Springer Science business media B.V.XP002759849 ISBN 979-1-465-6389-1, pp. 495-496.
The Pultex Pultrision Design Manual, Imperial Version, vol. 4. Rev. 9, Creative Pultrusions, Inc.

* cited by examiner

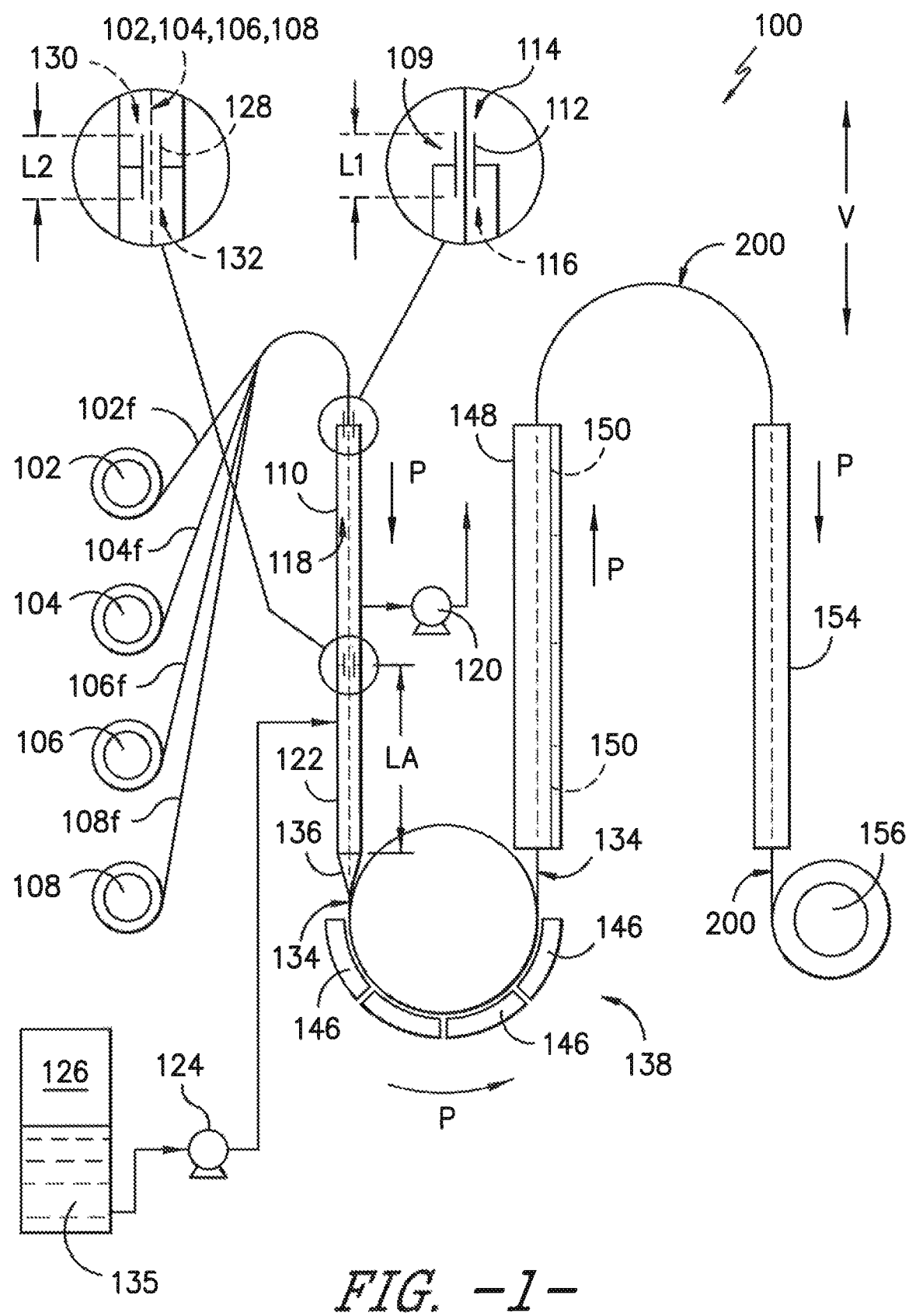
FIG. -1-

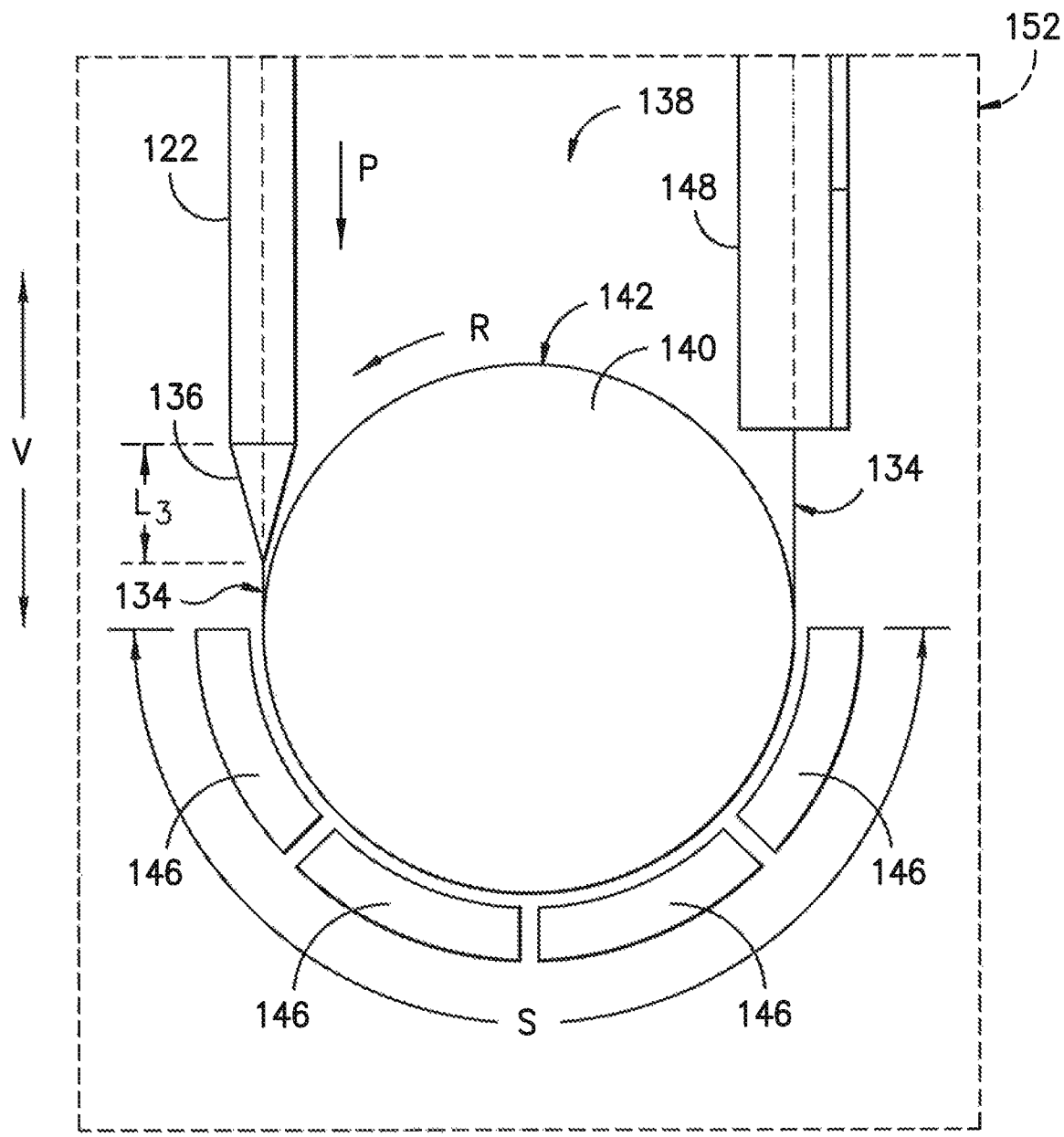
FIG. -2-

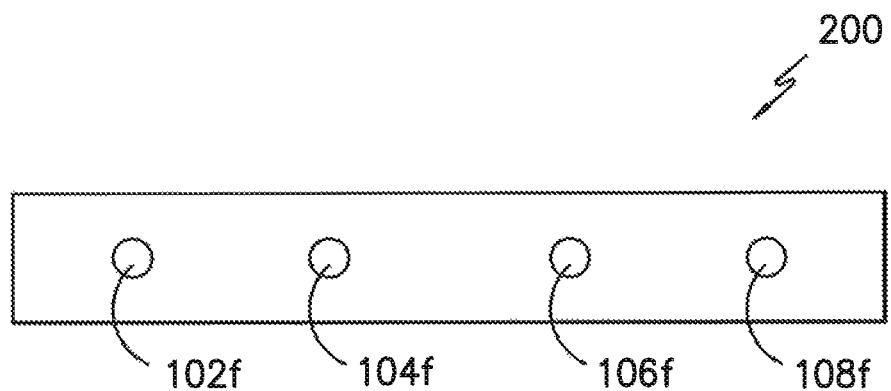
FIG. -3-
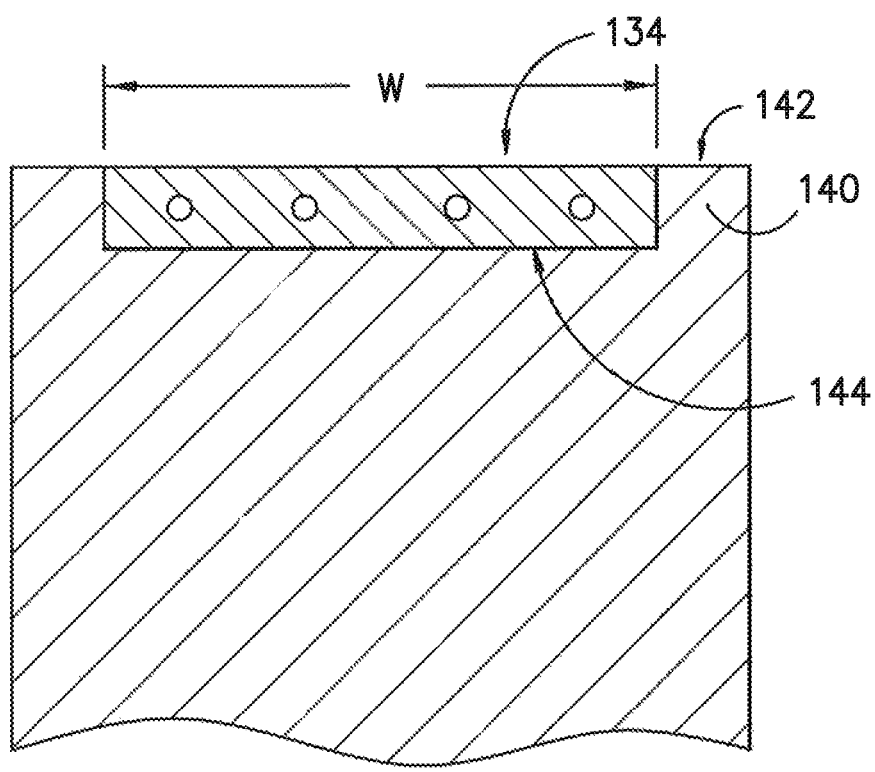
FIG. -4-

DEVICE FOR IMPREGNATION AND CURING OF CONTINUOUS FIBERS WITH RESIN

PRIORITY CLAIM

The present application is a 371 international of Application Number PCT/IB2015/058419 having an international filing date of Oct. 30, 2015. Applicants claim priority to and benefit of all such applications and incorporate all such applications herein by reference.

FIELD OF THE INVENTION

The present invention relates to a device for the continuous impregnation of continuous fibers with a resin that is cured post-impregnation using photo-initiators.

BACKGROUND OF THE INVENTION

Composite materials can be used for manufacturing structural or load-bearing components. Such composite materials can provide advantages in improved strength and reduced weight while achieving equivalent or better mechanical performance than non-composite materials. As used herein, a composite material typically includes elongated or continuous reinforcement fibers impregnated with a resin that is cured to bond the resin with the reinforcement fibers and create the desired mechanical properties.

In applications where the composite material is subject to increased stress, manufacturing conditions must be carefully controlled to achieve the mechanical properties desired. The resin joins the fibers firmly to one another and transmits stresses to the fibers. Ideally, the fibers are fully impregnated and distributed homogeneously over a cross-section of the composite element and in accordance with the desired level of reinforcement over the entire cross section of the composite element. Achieving such ideal construction is fraught with various challenges.

Pultrusion is a conventional method of manufacturing composite elements that involves continuously unwinding the reinforcing fibers and dipping them in a resin bath to ensure that the fibers are impregnated with the resin. The fibers and resin are drawn through a heated die, in order to effect at least partial polymerization of the resin. However, such pultrusion typically does not readily lend itself to high speed operation, as impregnation tends to be slow and difficult to control uniformly. Maintaining the proper positioning of the fibers within the resin can be difficult to control.

Another conventional technique disposes the reinforcement fibers within a mold, producing a vacuum in the mold, and impregnating the fibers with the resin. The vacuum can improve impregnation but the mold has finite dimensions and is a batch process, which limits the shape and dimensions of the manufactured component. As such, the molding technique does not allow for the continuous manufacture of long components and does not always uniformly impregnate the reinforcement fibers.

Accordingly, an apparatus for the manufacture of continuous, elongated composites would be useful. Such an apparatus that can be used to more uniformly impregnate the reinforcement fibers would also be beneficial. Such an apparatus that can also more rapidly impregnate the elongate composite with resin and cure the same would be also be particularly useful.

SUMMARY OF THE INVENTION

The present invention provides an apparatus for preparation of a continuous composite element formed of reinforcement fibers impregnated with a resin that includes photo-initiators for curing. The reinforcement fibers are pulled through a vacuum chamber and then a vertical impregnation chamber where impregnation with the resin occurs. The elongate composite is then deposited onto a rotating wheel of conformation. During rotation, a radiation source such as e.g., LEDs (light emitting diodes) are used to activate the photo-initiators and provide at least partial curing of the resin. From the wheel of conformation, the elongate, composite element is passed along a vertical course where additional radiation sources activate the photo-initiators and provided additional curing. The present invention allows high impregnation rates to be achieved while also providing an apparatus for continuous manufacture of the continuous composite. Additional objects and advantages of the invention will be set forth in part in the following description, or may be apparent from the description, or may be learned through practice of the invention.

In one exemplary embodiment of the present invention, the present invention provide an apparatus for manufacturing a continuous, elongate composite that includes reinforcement fibers impregnated within a cured resin. The apparatus includes a vacuum chamber having an inlet end and an outlet end with the vacuum chamber configured to apply a vacuum to the elongate composite. A first channel, located at the inlet end, is provided with an inlet and an outlet in communication with the vacuum chamber with the first channel configured to supply elongate composite to the vacuum chamber.

An impregnation chamber defines a longitudinal axis extending between an impregnation chamber inlet and an impregnation chamber outlet. The longitudinal axis is oriented along a vertical direction. The impregnation chamber is configured to impregnate the elongate composite with a resin. A second channel has an inlet in communication with the vacuum chamber and an outlet in communication with the impregnation chamber. At least one die is configured for shaping the elongate composite and is positioned downstream of the impregnation chamber.

The apparatus includes an assembly for curing the resin. The assembly is positioned downstream of the at least one die. The assembly includes a wheel onto which the impregnated, elongate composite is deposited and rotates with the wheel over a predetermined arc length. The assembly for curing the resin also includes a vertical course through which the impregnated, elongated composite passes after rotating with the wheel. A first radiation source is positioned adjacent to the predetermined arc length and is configured for at least partially curing the resin. A second radiation source is positioned adjacent to the vertical course and is configured for at least partially curing the resin.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic illustration of an exemplary embodiment of the present invention.

FIG. 2 provides a schematic illustration of a portion of the exemplary embodiment of FIG. 1. The view is magnified for purposes of additional clarity.

FIG. 3 provides a cross-sectional view of a continuous composite of the present invention at a later stage during its manufacturing.

FIG. 4 is a cross-sectional view near the outer peripheral surface of an exemplary conformation wheel of the present invention.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIGS. 1 and 2 provide schematic depictions of an exemplary apparatus 100 for the continuous impregnation of reinforcement fibers with a resin having photo-initiators so as to create a long, continuous composite element. In general, the reinforcement fibers are formed into an arrangement that is conveyed along a process direction P. The fibers are subjected, successively and in an overall process direction P, to various operations including degassing by the action of a vacuum in a vacuum chamber 110 and impregnation with the resin in a vertically-oriented impregnation chamber 122. This chamber 122 provides a pre-preg 134 containing the fibers and the resin while also keeping the arrangement substantially out of contact with the atmosphere during impregnation. As used herein, "pre-preg" means an uncured intermediate of the resin and reinforcement fibers.

The pre-preg 134 is passed through a die 136 having a cross section of predetermined area and shape, to provide the pre-preg 134 with a predetermined shape. Downstream of the die 136, the shape of the pre-preg is stabilized by at least partial polymerization of the pre-preg resin 135 using a curing assembly 138 having radiation sources 146 and 150 such as e.g., LEDs, electron beam, or gamma rays to activate the photo-initiators in the resin and thereby begin curing the resin.

Referring specifically now to FIG. 1, a plurality of bobbins 102, 104, 106, and 108 provide multiple feeds of continuous reinforcement fibers 102f, 104f, 106f, and 108f to the inlet end 109 of a vacuum chamber 110. A first channel 112 is positioned at inlet end 109 and defines a first channel inlet 114 and a first channel outlet 116, which is positioned within vacuum chamber 110.

While four bobbins are shown, any number may be used depending upon the level of reinforcement specified. The continuous reinforcement fibers 102f, 104f, 106f, and 108f may be constructed from a variety of components including e.g., organic fibers, such as high-tenacity polyacrylic fibers or oxidized polyacrylonitrile fibers, high-tenacity polyvinyl alcohol fibers, aromatic polyamide fibers or polyamide-imide fibers or polyimide fibers, chlorofibers, high-tenacity polyester fibers or aromatic polyester fibers, high-tenacity polyethylene fibers, high-tenacity polypropylene fibers, cellulose or rayon or high-tenacity viscose fibers, polyphenylene benzobisoxazole fibers or polyethylene naphthenate fibers, or they may be selected from among inorganic fibers such as glass fibers, carbon fibers, silica fibers or ceramic (alumina, aluminosilicate, borosilicoaluminate) fibers. The process preferably uses continuous, unidirectional fibers parallel to at least one preferential reinforcement direction, disposed substantially in parallel during impregnation with the composition.

First channel 112 may be constructed e.g., from a rigid-wall tube that ensures a continuous seal to minimize the flow of ambient air into the interior 118 of vacuum chamber 110 during operation. A pump 120 is used to draw a vacuum on chamber 110. Sealing by first channel 112 should be sufficient to allow pump 120 to maintain a vacuum of e.g., at least 0.1 bar (absolute pressure).

First channel 112 may also have a shape as may be desired for the shape of the continuous composite to be manufactured. For example, as shown in FIG. 3, the resulting elongate or continuous composite 200 may have a rectangular shape and include uniform spacing of reinforcement fibers 102f, 104f, 106f, and 108f. Other configurations such as e.g., circular, may be used as well. By way of example, the cross-section of first channel 112 may have width that is twice the width of the sum of the widths of the individual reinforcement fibers 102f, 104f, 106f, and 108f. The cross-sectional shape of first channel 112 may not be the ultimate shape desired for the finished elongate composite 200 and, instead, may be used to assist in providing an intermediate step in forming the ultimate shape desired for the finished component. The relative size of fibers in composite 200 is shown somewhat enlarged in FIGS. 3 and 4 for purposes of illustration only.

In one exemplary embodiment, the width or diameter D1 of the cross section (orthogonal to flow direction P) of first channel 112 is determined relative to the length L1, along process direction P, of first channel 112. For example, an increasing length L1 for first channel 112 improves the ability to maintain a vacuum in vacuum chamber 110. In addition, an increasing length L1 for first channel 112 also allows for a larger cross-sectional width or diameter for first channel 112 relative to the overall or combined cross-sectional width of reinforcement fibers 102f, 104f, 106f, and 108f. First channel 112, in one exemplary embodiment, has a cross-section (orthogonal to the process direction or direction of flow of material P) that remains constant over length L1. In still another embodiment, the cross section of first channel 112 does not increase along the process direction P between the inlet 114 and outlet 116.

Returning to FIGS. 1 and 2, a vertically-oriented impregnation chamber 122 is positioned downstream of vacuum chamber 110. A metering pump 124 provides a controlled flow of resin 135 from a tank 126. During operation, impregnation chamber 122 is completely filled with resin. Reinforcement fibers 102f, 104f, 106f, and 108f passing through vacuum chamber 110 undergo a vacuum treatment, which improves their ability to absorb the resin by e.g., removing air or other gases in fibers 102f, 104f, 106f, and 108f. A variety of resins may be used. For example, resin may 135 be an epoxy resin or may be selected from the group including vinyl ester resins and unsaturated polyester resins.

Notably, impregnation chamber 122 has a longitudinal axis LA that is parallel to the vertical direction V—i.e. axis LA is vertically-oriented or substantially parallel to vertical direction V. Under the action of gravity, such vertical orientation has been found to improve the uniformity of impregnation of reinforcement fibers 102f, 104f, 106f, and 108f with resin. Additionally, within impregnation chamber 122, the resin is predominantly liquid. The vertically-oriented impregnation chamber 122 allows for maintaining reinforcement fibers 102f, 104f, 106f, and 108f at relatively low tension. In turn, the low tension allows avoidance of unwanted movement of reinforcement fibers 102f, 104f, 106f, and 108f through the resin before it is hardened by curing. Such unwanted movement can result in undesirable positioning of such fibers within the overall shape of continuous composite 200 (FIG. 3) and undesirable positioning of such fibers relative to each other whereby the proper strength for the final composite 200 may not be achieved.

By way of example and comparison, with a vertically oriented impregnation chamber 122 having a length L1 of 4 meters, the tension swing or range of tension in the fibers was measured at 0.2 daN (deca-newtons) to 0.3 daN. A chamber of the same length L1 oriented horizontally had a tension swing in the fibers of 0.5 daN to 0.7 daN. The tension in the vertically-oriented chamber 122 is, therefore, substantially lower and provides for considerable more uniformity and control during manufacturing—leading to a stronger composite product 200.

A second channel 128 has an inlet 130 in communication with vacuum chamber 110 and an outlet 132 in communication with impregnation chamber 122. Reinforcement fibers 102f, 104f, 106f, and 108f pass from vacuum chamber 110 to impregnation chamber 122 through second channel 128. Second channel 128 has a length L2 along process direction P and a diameter of D2. Second channel 128 may be constructed e.g., from tubing. Second channel 128 ensures a seal between vacuum chamber 110 and impregnation chamber 122. In alternative embodiment, a die or other opening may be used instead of second channel 128 to connect vacuum chamber 110 and impregnation chamber 122.

At least one sizing die 136 is positioned downstream of impregnation chamber 122 and receives the now impregnated, continuous pre-preg 134 of resin 135 and reinforcement fibers 102f, 104f, 106f, and 108f. Sizing die 136 shapes composite 134 before polymerization of the resin 135 is initiated. In addition, sizing die 136 also affects the dimensions of the finished elongate, composite element 200. In one exemplary embodiment, sizing die 136 has a circular cross-section and the length L3 of the sizing die (along process direction P) is more than 50 times the smallest dimension of the opening in sizing die 136 through which material 134 passes.

Sizing die 136 can also assist in metering or controlling the proportion of reinforcement fibers 102f, 104f, 106f, and 108f relative to resin 135 in the finished product. More particularly, the proportion of fiber relative to resin depends on the minimum passage cross section through sizing die 136 relative to the total cross section of the combined fibers 102f, 104f, 106f, and 108f. While only one sizing die 136 is shown, a series of dies may be used if sizing in multiple steps is desired or useful.

The impregnating resin 135 is typically relatively fluid at ambient temperature and has no mechanical stability of its own. Conversion of the impregnated resin into the solid phase adds strength and dimensional stability to the product, enabling storage or additional use in manufacture. Accordingly, as shown in FIG. 2, a resin curing assembly 138 is positioned downstream of sizing die 136. The resin includes a photo-initiator that, when activated by light in a certain frequency range, causes the resin to cure into a more rigid state. In one exemplary embodiment, the photo-initiator that may be selected from the group including phosphine oxides (PO).

As described below, radiation sources 146, 148 provide radiation to activate the photo-initiators and cure the resin. For example, LEDs may be used to provide the radiation necessary to activate the photo-initiators. For example, in one exemplary embodiment, LEDs may be used produce light in wavelength range of 260 nanometers (nm) to 420 nm.

Resin curing assembly 138 includes at least one conformation wheel 140 onto which the now uncured, resin-impregnated composite 134 is delivered. Wheel 140 rotates in the direction of arrow R as composite 134 is deposited onto the outer peripheral surface 142. In order to minimize tension in composite 134 and particularly fibers 102f, 104f, 106f, and 108f, the diameter of conformation wheel 140 is determined relative to other process conditions such as e.g., processing speed, size of composite 134, and other factors. Referring to FIG. 4, the outer peripheral surface 142 may include a groove 144 into which the composite 134 is received. Groove 144 can assist in shaping composite 134, and shapes other than what is shown may be used.

Returning to FIG. 2, composite 134 rotates with wheel 140 over a predetermined arc length S before transferring to a vertical course 148. One or more first radiation sources 146 are positioned adjacent to wheel 140. As shown, radiation sources 146 are adjacent to outer peripheral surface 142 of wheel 140. While composite 134 travels over arc length S, at least a portion of the resin 135 therein is cured by the radiation transmitted from first plurality of radiation sources 146. By way of example, first radiation sources 146 may each include a plurality of LEDs or other radiation creating elements.

Vertical course 148 is positioned downstream along flow direction P from wheel 140 and extends longitudinally along vertical direction V. Vertical course 148 may include a track, slide, or mechanical support for composite 134. Alternatively, vertical course 148 may be merely a vertical path along process direction P over which composite 134 is in a vertical position during curing.

One or more second radiation sources 150 are positioned adjacent to vertical course 148 and extend parallel to at least partially cured composite 134. Second radiation sources 150 are configured to provide radiation to continue activation of the photo-initiator in order to complete or substantially complete curing of the resin. For example, the curing is substantially cured when a Differential Scanning Calorimeter (DSC) test indicates no significant exothermic behavior from −50° C. to 220° C.

As stated, the first and second radiation sources 146 and 150 allow curing or polymerization to be initiated and maintained. Such curing provides a stabilized material 200 that can be further manipulated by e.g., bending or rolling up for storage. However, radiation sources 146 and 150 also allow the degree of curing or polymerization to be carefully controlled as a maximum level of such curing may be desired. Accordingly, the amount of exposure to radiation from radiation sources 146 and 150 can be determined based on e.g., the number radiation sources used, the speed at which the composite material 134 passes the radiation sources, and other factors. Radiation sources 146 and 150 can be spaced apart along not only the direction of flow P, but can also be positioned adjacent to each other along the width W (FIG. 4) of composite material—i.e. along a direction orthogonal to the flow direction or process direction P. In another exemplary embodiment, assembly 138 may not include radiation source 150 as all curing of the resin occurs due to radiation source 146.

In one exemplary aspect, the curing or stabilization process that occurs with assembly 138 may occur in an inert atmosphere. For example, curing assembly 138 may be enclosed within a tank or other vessel 152 flooded with an inert gas. Vertical course 148 may be within, partially within, or completely outside of, such vessel 152.

After curing along vertical course 148, additional steps may be added to the process of the resulting continuous composite 200. For example, composite 200 may be heated using heat source 154 such that composite 200 can be wound onto a bobbin 156 for storage and transport. Other post-curing steps may be used as well.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An apparatus for manufacturing a continuous, elongate composite that includes reinforcement fibers impregnated within a cured resin, the apparatus comprising:
    a vacuum chamber having an inlet end and an outlet end, the vacuum chamber configured to apply a vacuum to the elongate composite;
    a first channel having an inlet and having an outlet in communication with the vacuum chamber, the first channel positioned at the inlet end of the vacuum chamber and configured to supply elongate composite to the vacuum chamber;
    an impregnation chamber defining a longitudinal axis extending between an impregnation chamber inlet and an impregnation chamber outlet, the longitudinal axis oriented along a vertical direction, the impregnation chamber configured to impregnate the elongate composite with a resin and configured to maintain in the impregnation chamber a tension in each of the fibers of the elongate composite in a range of 0.2 daN to 0.3 daN;
    a second channel having an inlet in communication with the vacuum chamber and an outlet in communication with the impregnation chamber;
    at least one die configured for shaping the elongate composite and positioned downstream of the impregnation chamber;
    an assembly for curing the resin, the assembly positioned downstream of the at least one die, the assembly comprising:
        a wheel onto which impregnated, elongate composite is deposited and rotates with the wheel over a predetermined arc length;
        a vertical course through which the impregnated, elongated composite passes after rotating with the wheel; and
        a first radiation source positioned adjacent to the predetermined arc length and configured for at least partially curing the resin; and
        a second radiation source positioned adjacent to the vertical course and configured for at least partially curing the resin.

2. The apparatus for manufacturing a continuous, elongate composite as in claim 1, wherein the wheel defines a groove extending circumferentially around an outside surface of the wheel, the groove configured for receipt of the impregnated, elongate composite.

3. The apparatus for manufacturing a continuous, elongate composite as in claim 1, a plurality of bobbins positioned upstream of the first channel and configured to supply elongate composite to the inlet of the first channel.

4. The apparatus for manufacturing a continuous, elongate composite as in claim 1, wherein the resin comprises photo-initiators.

5. The apparatus for manufacturing a continuous, elongate composite as in claim 1, wherein the first channel has a length along a process direction, and wherein a cross-section of the first channel remains constant between the inlet and the outlet of the first channel.

6. The apparatus for manufacturing a continuous, elongate composite as in claim 1, wherein the first channel has a length along a process direction, and wherein a cross-section of the first channel does not increase between the inlet and the outlet of the first channel.

7. The apparatus for manufacturing a continuous, elongate composite as in claim 1, wherein the first channel has a non-circular cross-section.

8. The apparatus for manufacturing a continuous, elongate composite as in claim 1, wherein the assembly for curing the resin is enclosed within an inert atmosphere.

9. The apparatus for manufacturing a continuous, elongate composite as in claim 1, further comprising a tank for supplying resin to the impregnation chamber.

10. The apparatus for manufacturing a continuous, elongate composite as in claim 9, further comprising a metering pump in fluid communication with the tank and configured for providing a controlled amount of resin to the impregnation chamber.

11. The apparatus for manufacturing a continuous, elongate composite as in claim 1, wherein the wheel includes an outer peripheral surface for receipt of the impregnated, elongate composite.

12. The apparatus for manufacturing a continuous, elongate composite as in claim 11, wherein the outer peripheral surface of the wheel defines a groove into which the impregnated, elongate composite is deposited.

13. The apparatus for manufacturing a continuous, elongate composite as in claim 1, wherein the first radiation source comprises a first plurality of LEDs.

14. The apparatus for manufacturing a continuous, elongate composite as in claim 13, wherein the second radiation source comprises a second plurality of LEDs.

15. The apparatus for manufacturing a continuous, elongate composite as in claim 14, wherein the first and second radiation sources have a wavelength in the range of 200 nm to 420 nm.

16. An apparatus for manufacturing a continuous, elongate composite that includes reinforcement fibers impregnated within a cured resin, the apparatus comprising:
    a vacuum chamber having an inlet end and an outlet end, the vacuum chamber configured to apply a vacuum to the elongate composite;

a first channel having an inlet and having an outlet in communication with the vacuum chamber, the first channel positioned at the inlet end of the vacuum chamber and configured to supply elongate composite to the vacuum chamber;

an impregnation chamber defining a longitudinal axis extending between an impregnation chamber inlet and an impregnation chamber outlet, the longitudinal axis oriented along a vertical direction, the impregnation chamber containing a resin for impregnating the fibers;

a second channel having an inlet in communication with the vacuum chamber and an outlet in communication with the impregnation chamber;

at least one die configured for shaping the elongate composite and positioned downstream of the impregnation chamber;

an assembly for curing the resin, the assembly positioned downstream of the at least one die, the assembly comprising:
- a wheel onto which impregnated, elongate composite is deposited and rotates with the wheel over a predetermined arc length;
- a vertical course through which the impregnated, elongated composite passes after rotating with the wheel; and
- a first radiation source positioned adjacent to the predetermined arc length and configured for at least partially curing the resin; and
- a second radiation source positioned adjacent to the vertical course and configured for at least partially curing the resin.

* * * * *